April 1, 1930.  D. A. BARNETT  1,752,937
AUTOMATIC CLUTCH MECHANISM
Filed Feb. 24, 1922
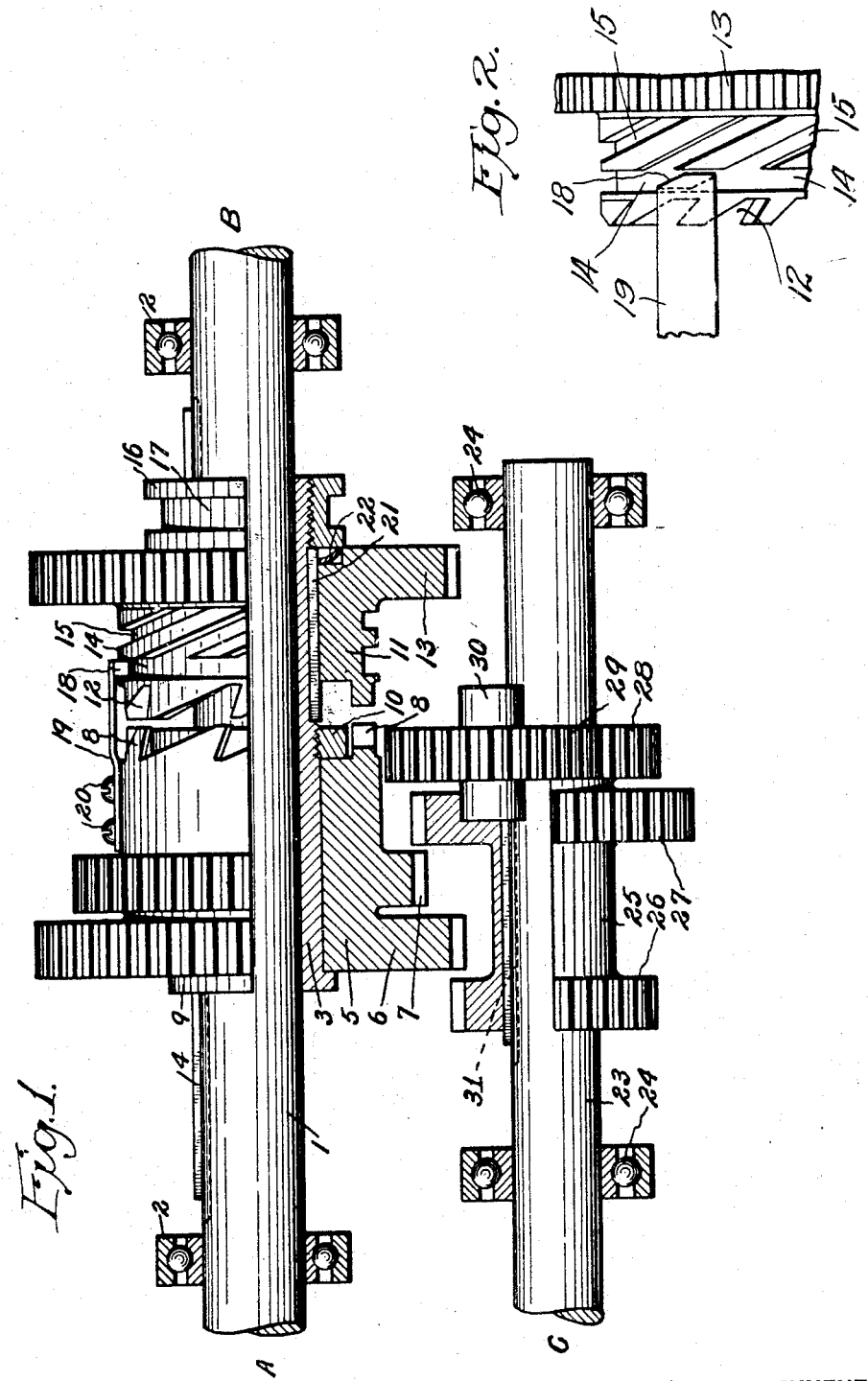
INVENTOR.
David A. Barnett
BY
Chester H. Boulton ATTORNEY Patented Apr. 1, 1930

1,752,937

UNITED STATES PATENT OFFICE

DAVID A. BARNETT, OF NEW HAVEN, CONNECTICUT, ASSIGNOR TO HEANY LABORATORIES, INC., OF NEW HAVEN, CONNECTICUT, A CORPORATION OF CONNECTICUT

AUTOMATIC CLUTCH MECHANISM

Application filed February 24, 1922. Serial No. 538,875.

This invention relates to an automatic mechanism comprising a main shaft driven by one source of power; an auxiliary shaft driven by another source of power; a combination of gears selectively connecting the two shafts with a sliding clutch member arranged to drive in only one direction and so designed as to automatically connect or disconnect said gears to the main shaft according to the relative speeds of the two shafts; an extra set of gears manually controlled for driving the main shaft in reverse direction from the auxiliary shaft.

The object of the invention is to provide a means of selectively driving a main shaft directly or from one or more auxiliary shafts running at the same or different speeds and arranged for the auxiliary shaft to automatically mesh in and pick up the load at any time the speed of the main shaft drops to a predetermined ratio to the auxiliary shaft speed and conversely for the direct drive to overcome that of the auxiliary shaft and automatically release same from driving connection at any time that the main drive speed rises to the predetermined ratio.

One application of the device would be to insure continuous operation of a shaft by providing connection with another shaft or source of power whereby the reserve would mesh in and carry the load at any time that the usual source of power failed and the shaft speed thereby dropped to the point of engagement with the reserve shaft.

Another application would be that of starting a prime mover by means of another unit and would provide means of disengagement when the prime mover picked up speed.

Another application would be that in which the shaft to be driven was connected to a prime mover by some form of slipping clutch arranged to drive only above a predetermined speed and the auxiliary shaft driven by the same prime mover by a normally rigid connection, the connection between the shafts being some suitable reduction gear so that the load would be started at low speed, and at some predetermined speed or speed ratio, the direct drive would overcome the reduction gear drive and release it from driving connection. Conversely, if the slipping device used for direct driving, by reason of increased torque requirement, allowed the shaft speed to drop to the predetermined ratio with the second shaft speed, the device would automatically mesh the second shaft into driving connection with the first through the gear reduction.

In the drawings, Fig. 1 is a side view of the clutch embodying the invention with certain parts in section for the purpose of more clearly illustrating the invention, and Fig. 2 is a plan view of a detail of the mechanism shown in Fig. 1.

Figure 1 shows the essential parts of such a device in which 1 represents the main shaft supported in suitable bearings as at 2, receiving power from some source at A and delivering power to a load at B. Slidingly mounted on shaft 1 is sleeve 3, revolvingly fixed thereto by key 4. Mounted on sleeve 3 and revolvingly free thereon is a member 5 consisting of a large gear 6, a smaller gear 7 and a jaw clutch member 8 arranged with teeth to drive only in one direction, 5 is kept from longitudinal motion along 3 by collar 9 and nut 10 or other means. Also mounted on sleeve 3 and slidingly keyed thereto by key 21 is another member 11 consisting of a jaw clutch member 12 and a large gear 13 and having on its outside periphery a circular groove 14 and one or more spiral grooves 15 having the same pitch as the back side of the teeth of jaw clutch member 12 and opening into the circular groove 14. Nut 16 is provided to limit longitudinal motion of member 11 along the sleeve and may be provided with circular groove 17 for engagement with suitable shifting means not shown for imparting longitudinal motion along the shaft to sleeve 3 and its supported members. 18 is a pin or tooth made in the form of a parallelogram having two sides parallel with sides of groove 14 and the other two sides parallel with sides of grooves 15 so as to be a good sliding fit in either of said grooves. 18 is rigidly fastened to arm 19 which is in turn rigidly fastened to 5 by screws 20 or other means. 22 is some form of spring for imparting initial motion to 11 along sleeve 3.

23 is an auxiliary shaft supported in suitable bearings as 24 receiving power from some source at C and carrying a member 25 fixedly keyed thereto by key 31 and consisting of a small gear 26 for meshing with 6, a larger gear 27 for meshing with 7, and a small gear 28 for meshing with idler 29 revolving on fixed pin 30 and arranged to mesh with gear 13 for reverse driving of shaft 1.

The operation of the device follows: When shaft 1 is at standstill, and gears 6—26 or 7—27 in mesh the application of power to shaft 23 at C will cause the member 5 on sleeve 3 to rotate. Member 11 on sleeve 3 has some tendency to move toward 5 due to the spring 22 so that as tooth 18 is carried around by the revolution of 5 it will engage in the spiral groove 15 and draw 11 toward 5 until jaw clutch 8—12 is engaged. Shaft 1 is then driven through key 21, sleeve 3, and key 4 by the power transmitted from shaft 23 at a speed determined by the intermediate gear ratio.

If direct power is then applied to shaft 1 at A as by the engagement of a slipping clutch or other means, sufficient to drive the shaft at a higher speed than it is being driven, 11 will be driven at a higher speed than it was driven by the reduction gear, and the jaw clutch will force members 5 and 11 out of engagement and member 5 will continue to run free on sleeve 3 at the speed determined by the gear ratio while 11 continues to run at the speed of shaft 1 and is held out of engagement with 5 by tooth 18 revolving in circular groove 14 relatively backward with respect to spiral groove 15.

If the direct power driving shaft 1 should decrease as would be the case of a clutch drive slipping due to increased torque requirement at B and the slipping increased to such a point that the speed of shaft 1 and therefore sliding member 11 becomes equal to that at which revolving member 5 is driven by the gear reduction from shaft 23, the same relative conditions obtain as when shaft 1 was at standstill and the same operation of meshing between members 5 and 11 takes place and shaft 23 drives shaft 1 as long as these conditions of speed and torque continue.

A feature of the invention is that the engagement or disengagement takes place at a time when there is very small difference in speed between 5 and 11 so that there is no tendency to clashing as is the case with ordinary transmissions when gears of relatively high difference in speeds are meshed together.

Another feature is that engagement or disengagement is governed entirely by relative speed and torque conditions and may be at any actual speed.

Any number of gear ratios may be provided between shaft 23 and revolving member 5 and secondary transmission of power may be through any one of them or only the lowest ratio may be used for all ordinary conditions and the higher ratios kept for extreme starting conditions. The reverse gears may be included in cases where reverse driving would sometimes be necessary.

It is not the intent to limit the construction to the form shown as any other combination which would perform the same functions could be used as, for instance, sleeve 3 with its members could be stationary on shaft 1 and the gears carried on shaft 23 be selectively movable along the shaft.

What I claim is:

1. In a power transmission mechanism, a shaft, a sleeve slidably and non-rotatably mounted upon said shaft, a clutch member rotatably mounted on said sleeve, a constantly rotating shaft adjacent said first shaft, selective means depending on the position of said sleeve on said first shaft for driving said clutch member at different speeds with respect to said constantly driven shaft, a second clutch member non-rotatably mounted on said sleeve but adapted to have a limited axial movement thereupon toward and away from said first clutch member, said clutch members being adapted to engage each other, whereby said second clutch member is driven by said first clutch member when in engagement, and means to cause said clutch members to separate when said first shaft tends to rotate faster than said first clutch member and to cause the engagement of said clutch members when said first shaft tends to rotate slower than said first clutch member.

2. In a power transmission mechanism, a shaft, a sleeve slidably but non-rotatably mounted on said shaft, a clutch member rotatably mounted on said sleeve, a constantly driven shaft, means depending on the position of said sleeve on said first shaft to selectively drive said clutch member at different speeds from said constantly driven shaft, a second clutch member non-rotatably mounted on said sleeve but adapted to have a limited axial movement thereon toward and away from said first clutch member, whereby said first clutch member drives said second clutch member when said members are in engagement, means to cause said second clutch member to separate from said first clutch member when said first shaft tends to rotate at a speed faster than said first clutch member and to cause said clutch members to be drawn toward each other when said first shaft tends to rotate at a speed slower than said first clutch member, and means depending on the position of said sleeve on said first shaft to drive said second clutch member independently of said first clutch member.

In testimony whereof, I affix my signature.

DAVID A. BARNETT.